US010462591B2

(12) United States Patent
Farber

(10) Patent No.: US 10,462,591 B2
(45) Date of Patent: Oct. 29, 2019

(54) METHODS, SYSTEMS, AND MEDIA FOR PROVIDING SOUND LEVEL INFORMATION FOR A PARTICULAR LOCATION

(71) Applicant: Gregory Farber, New York, NY (US)

(72) Inventor: Gregory Farber, New York, NY (US)

(73) Assignee: SoundPrint LLC, New York, NY (US)

( * ) Notice: Subject to any disclaimer, the term of this patent is extended or adjusted under 35 U.S.C. 154(b) by 0 days.

(21) Appl. No.: 15/153,326

(22) Filed: May 12, 2016

(65) Prior Publication Data

US 2016/0337774 A1    Nov. 17, 2016

Related U.S. Application Data

(60) Provisional application No. 62/161,010, filed on May 13, 2015.

(51) Int. Cl.
*H04R 29/00* (2006.01)
*G06Q 50/00* (2012.01)
*G06Q 30/02* (2012.01)

(52) U.S. Cl.
CPC ....... *H04R 29/008* (2013.01); *G06Q 30/0201* (2013.01); *G06Q 50/01* (2013.01)

(58) Field of Classification Search
CPC ... H04R 29/008; G06Q 30/0201; G06Q 50/01
USPC ................. 381/56, 122, 86; 455/566, 550.1; 709/218, 217
See application file for complete search history.

(56) References Cited

U.S. PATENT DOCUMENTS

| 2004/0194549 A1* | 10/2004 | Noel | B60R 11/02 73/587 |
| 2010/0079342 A1* | 4/2010 | Smith | G01H 17/00 342/451 |
| 2014/0201276 A1* | 7/2014 | Lymberopoulos | H04W 4/21 709/204 |
| 2015/0134418 A1* | 5/2015 | Leow | G06Q 30/0205 705/7.34 |
| 2015/0162047 A1* | 6/2015 | Lacirignola | G10L 21/0208 700/94 |

* cited by examiner

*Primary Examiner* — Vivian C Chin
*Assistant Examiner* — Con P Tran
(74) *Attorney, Agent, or Firm* — Byrne Poh LLP

(57) ABSTRACT

Methods, systems, and media for providing sound level information for a particular location are provided. In some embodiments, the method comprises: receiving, from a user device, a request for sound level indications associated with a geographic region; in response to receiving the request, identifying a plurality of locations associated with the geographic region; identifying, for each location in the plurality of locations, at least one sound level reading corresponding to the location; generating, for each location in the plurality of locations, sound level indications based on the at least one sound level reading corresponding to the location; and transmitting at least one of the sound level indications and an identifier of at least one location in the plurality of locations corresponding to the at least one of the sound level indications to the user device.

39 Claims, 15 Drawing Sheets

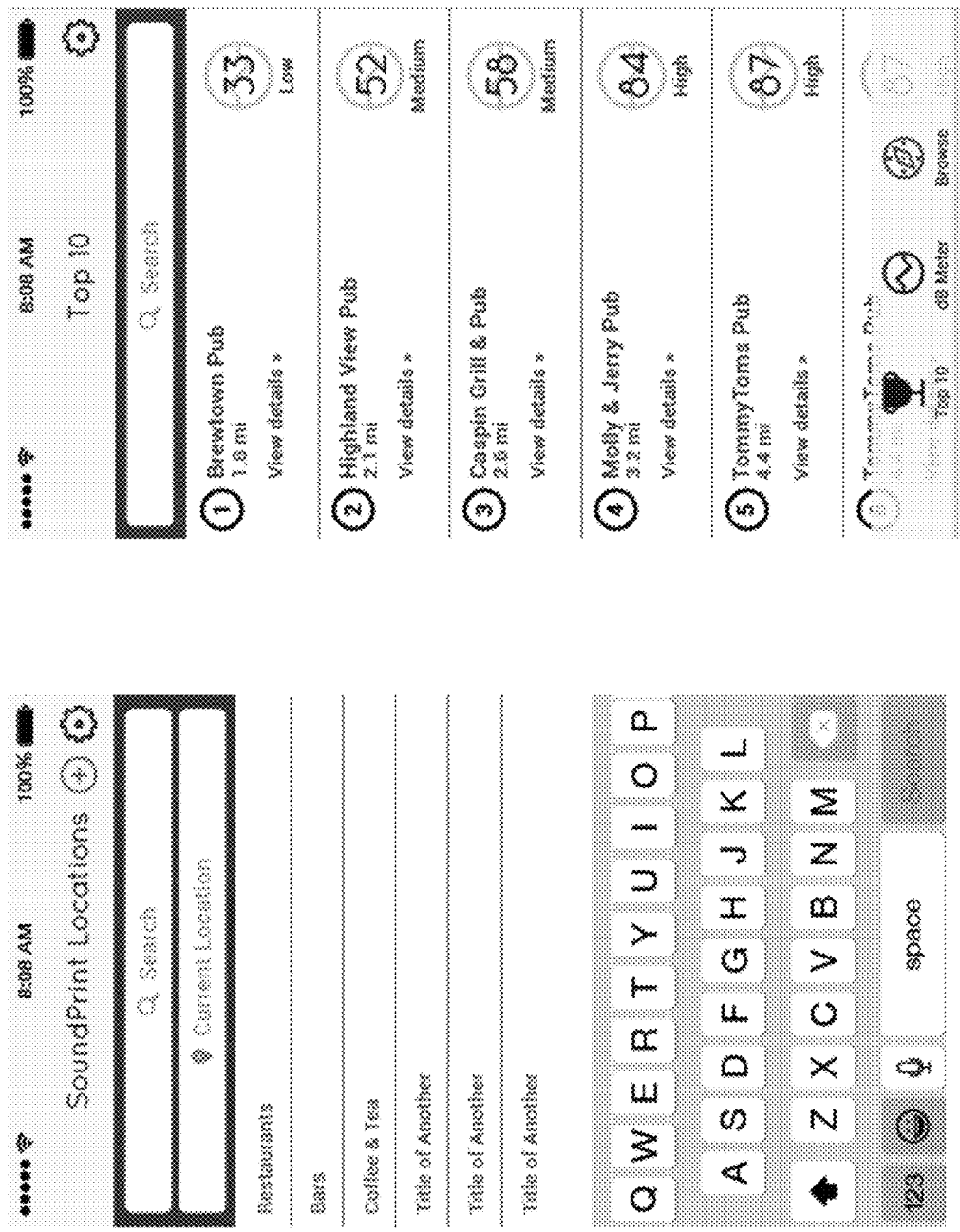

METHODS, SYSTEMS, AND MEDIA FOR PROVIDING SOUND LEVEL INFORMATION FOR A PARTICULAR LOCATION

CROSS-REFERENCE TO RELATED APPLICATIONS

This application claims the benefit of U.S. Provisional Patent Application No. 62/161,010, filed May 13, 2015, which is hereby incorporated by reference herein in its entirety.

TECHNICAL FIELD

The disclosed subject matter relates to methods, systems, and media for providing sound level information for a particular location.

BACKGROUND

People often enjoy going to different locations such as restaurants, coffee shops, bars, parks, or shops with friends or acquaintances. However, it can be difficult to talk to other people in a crowded area because of surrounding noise. For example, it can be difficult to have a conversation in a crowded restaurant or coffee shop because of the ambient noise in the restaurant, other conversations nearby, etc., and people who are hard of hearing may find it especially difficult.

Accordingly, it is desirable to provide methods, systems, and media for providing sound level information for a particular location.

SUMMARY

Methods, systems, and media for providing sound level information for a particular location are provided. In accordance with some embodiments of the disclosed subject matter, methods for providing sound level information for a particular location are provided, the methods comprising: receiving, from a user device, a request for sound level indications associated with a geographic region; in response to receiving the request, identifying a plurality of locations associated with the geographic region; identifying, for each location in the plurality of locations, at least one sound level reading corresponding to the location; generating, for each location in the plurality of locations, sound level indications based on the at least one sound level reading corresponding to the location; and transmitting at least one of the sound level indications and an identifier of at least one location in the plurality of locations corresponding to the at least one of the sound level indications to the user device.

In accordance with some embodiments of the disclosed subject matter, system for providing sound level information for a particular location are provided, the systems comprising: a hardware processor that is programmed to: receive, from a user device, a request for sound level indications associated with a geographic region; in response to receiving the request, identify a plurality of locations associated with the geographic region; identify, for each location in the plurality of locations, at least one sound level reading corresponding to the location; generate, for each location in the plurality of locations, sound level indications based on the at least one sound level reading corresponding to the location; and transmit at least one of the sound level indications and an identifier of at least one location in the plurality of locations corresponding to the at least one of the sound level indications to the user device.

In accordance with some embodiments of the disclosed subject matter, non-transitory computer-readable media containing computer executable instructions that, when executed by a processor, cause the processor to perform a method for providing sound level information for a particular location are provided, the method comprising: receiving, from a user device, a request for sound level indications associated with a geographic region; in response to receiving the request, identifying a plurality of locations associated with the geographic region; identifying, for each location in the plurality of locations, at least one sound level reading corresponding to the location; generating, for each location in the plurality of locations, sound level indications based on the at least one sound level reading corresponding to the location; and transmitting at least one of the sound level indications and an identifier of at least one location in the plurality of locations corresponding to the at least one of the sound level indications to the user device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 7A-7F show examples of user interfaces for receiving information associated with a recorded sound level reading and for transmitting the sound level reading and the received information in accordance with some embodiments of the disclosed subject matter.

FIG. 8 shows an example of a user interface for requesting sound level information in accordance with some embodiments of the disclosed subject matter.

FIG. 9 shows an example of a user interface for presenting an ordered list of businesses based on sound level information in accordance with some embodiments of the disclosed subject matter.

DETAILED DESCRIPTION

In accordance with various embodiments, mechanisms (which can include methods, systems, and media) for providing sound level information for a particular location are provided.

In some embodiments, the mechanisms can receive a sound level reading from a first user device, which can indicate a sound level (e.g., an indication of loudness) in an area near the first user device. For example, the first user device can record ambient noise (e.g., in a restaurant, in a coffee shop, in a park, near a construction zone, and/or in any other suitable location) using a microphone, and can calculate a sound level associated with the recorded noise. The first user device can additionally receive (e.g., from a user interface presented on the first user device) any other relevant information, such as a name of a business at which the sound level reading was recorded, an address and/or intersection at which the sound level reading was recorded, interactions with a manager and/or owner of a business at which the sound level reading was recorded, and/or any other suitable information. The first user device can then transmit the sound level reading and the information to a sound rating server.

In some embodiments, the sound rating server can store the received sound level reading and the information. The sound rating server can additionally receive requests for sound level information, for example, from a second user device. In some embodiments, the request can be for sound level information corresponding to a particular location and/or category. As a particular example, the request can be for sound level information for restaurants that serve a particular type of cuisine and are located in a particular geographic region. In response to receiving the request, the sound rating server can identify particular businesses and/or locations relevant to the request, and can aggregate sound level readings corresponding to the identified businesses and/or locations. The sound rating server can then transmit the aggregated information to the second user device.

In some embodiments, the second user device can then cause the aggregated sound level information to be presented. For example, in some embodiments, the aggregated sound level information can be presented in a list, in a map, and/or in any other suitable manner. As a more particular example, in some embodiments, the second user device can present a list of businesses meeting the request criteria that are associated with sound level readings that are below a predetermined threshold, above a predetermined threshold, and/or are within a particular range (e.g., between 50 dB and 55 dB, between 60 dB and 80 dB, and/or any other suitable range). As another more particular example, in some embodiments, the second user device can present a map with markers that indicate locations of businesses meeting the request criteria as well as average sound level readings associated with each business.

Figure 1:
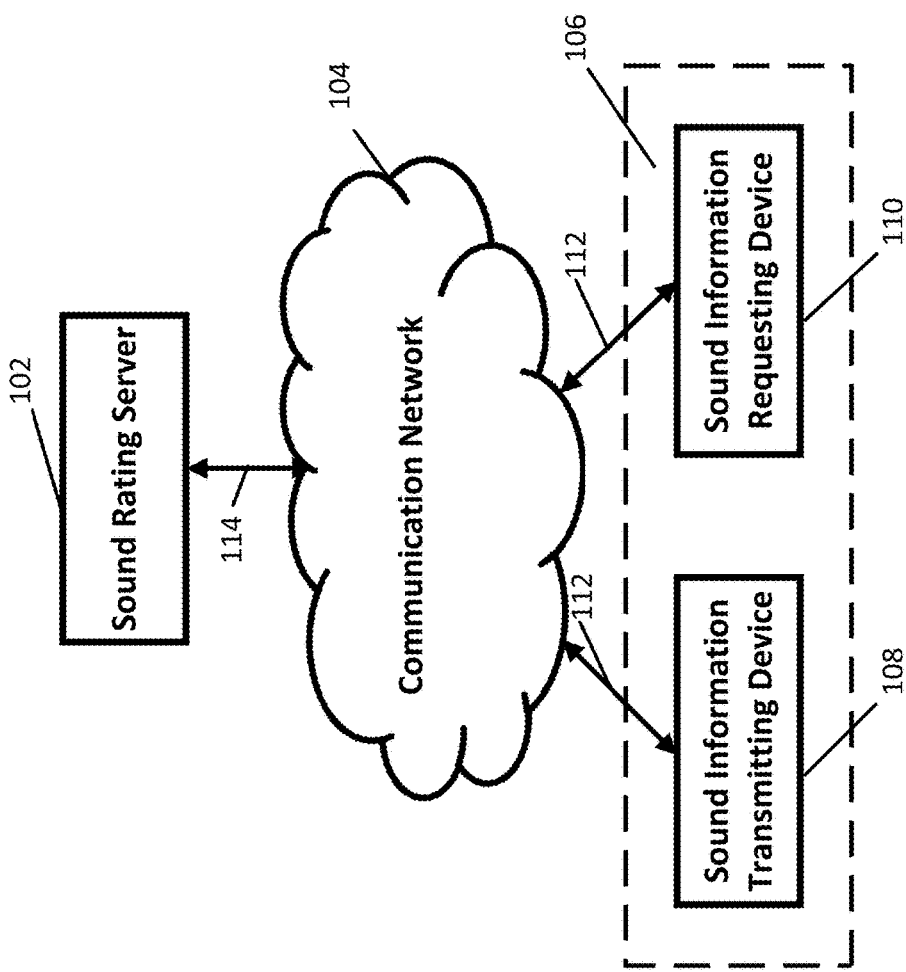
FIG. 1 shows a schematic diagram of an illustrative system suitable for implementation of mechanisms described herein for providing sound level information for a particular location in accordance with some embodiments of the disclosed subject matter.

Turning to FIG. 1, an example 100 of hardware for providing sound level information for a particular location that can be used in accordance with some embodiments of the disclosed subject matter is shown. As illustrated, hardware 100 can include one or more servers such as a sound rating server 102, as well as a communication network 104, and/or one or more user devices 106, such as sound information transmitting device 108 and sound information requesting device 110.

In some embodiments, sound rating server 102 can be any suitable server for receiving sound level readings from a first user device, using the received sound level readings to aggregate sound information for a particular location, and transmitting aggregated sound information related to a particular location to a second user device in response to a request. For example, in some embodiments, sound rating server 102 can receive a sound level reading and information indicating a location of the recorded sound level reading (e.g., the name of a restaurant, an address associated with a residential building, an intersection, and/or any other suitable location information), and sound rating server 102 can store the received information. As another example, in some embodiments, sound rating server 102 can receive a request for sound information related to a particular location (e.g., a zip code, a city, an intersection, Global Positioning System (GPS) coordinates, and/or any other suitable location information) and/or category (e.g., restaurants, bars, coffee shops, libraries, bookstores, and/or any other suitable category), and can identify sound level readings related to the received request (e.g., sound level readings recorded near the particular location and/or from places related to the category). Sound rating server 102 can then compile the identified sound level readings and can transmit the compiled information to the requesting user device, as described below in connection with FIG. 3.

Communication network 104 can be any suitable combination of one or more wired and/or wireless networks in some embodiments. For example, communication network 104 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 106 can be connected by one or more communications links 112 to communication network 104 that can be linked via one or more communications links (e.g., communications link 114) to sound rating server 102. Communications links 112 and 114 can be any communications links suitable for communicating data among user devices 106 and server 102 such as network links, dial-up links, wireless links, hard-wired links, any other suitable communications links, or any suitable combination of such links.

In some embodiments, user devices 106 can include one or more computing devices suitable for recording a sound, transmitting a sound level reading, requesting sound level reading information associated with a particular location, and/or any other suitable functions. For example, in some embodiments, user devices 106 can be implemented as a mobile device, such as a smartphone, mobile phone, a tablet computer, a laptop computer, a watch, a wearable computer, a vehicle (e.g., a car, a boat, an airplane, or any other suitable vehicle) entertainment system, a portable media player, a professional audio recording device, and/or any other suitable mobile device. As another example, in some embodiments, user devices 106 can be implemented as a non-mobile device such as a desktop computer, a set-top box, a television, a streaming media player, a game console, a smart appliance (e.g., a smart light bulb, a smart thermostat, and/or any other suitable type of smart device), and/or any other suitable non-mobile device. Note that, although user devices 108 and 110 are described as transmitting sound information and requesting sound information, respectively, in some embodiments, each of user devices 108 and 110 can both transmit and request sound information.

Although sound rating server 102 is illustrated as a single device, the functions performed by sound rating server 102 can be performed using any suitable number of devices in some embodiments. For example, in some embodiments, multiple devices can be used to implement the functions performed by sound rating server 102.

Although two user devices 108 and 110 are shown in FIG. 1, any suitable number of user devices, and/or any suitable types of user devices, can be used in some embodiments.

Figure 2:
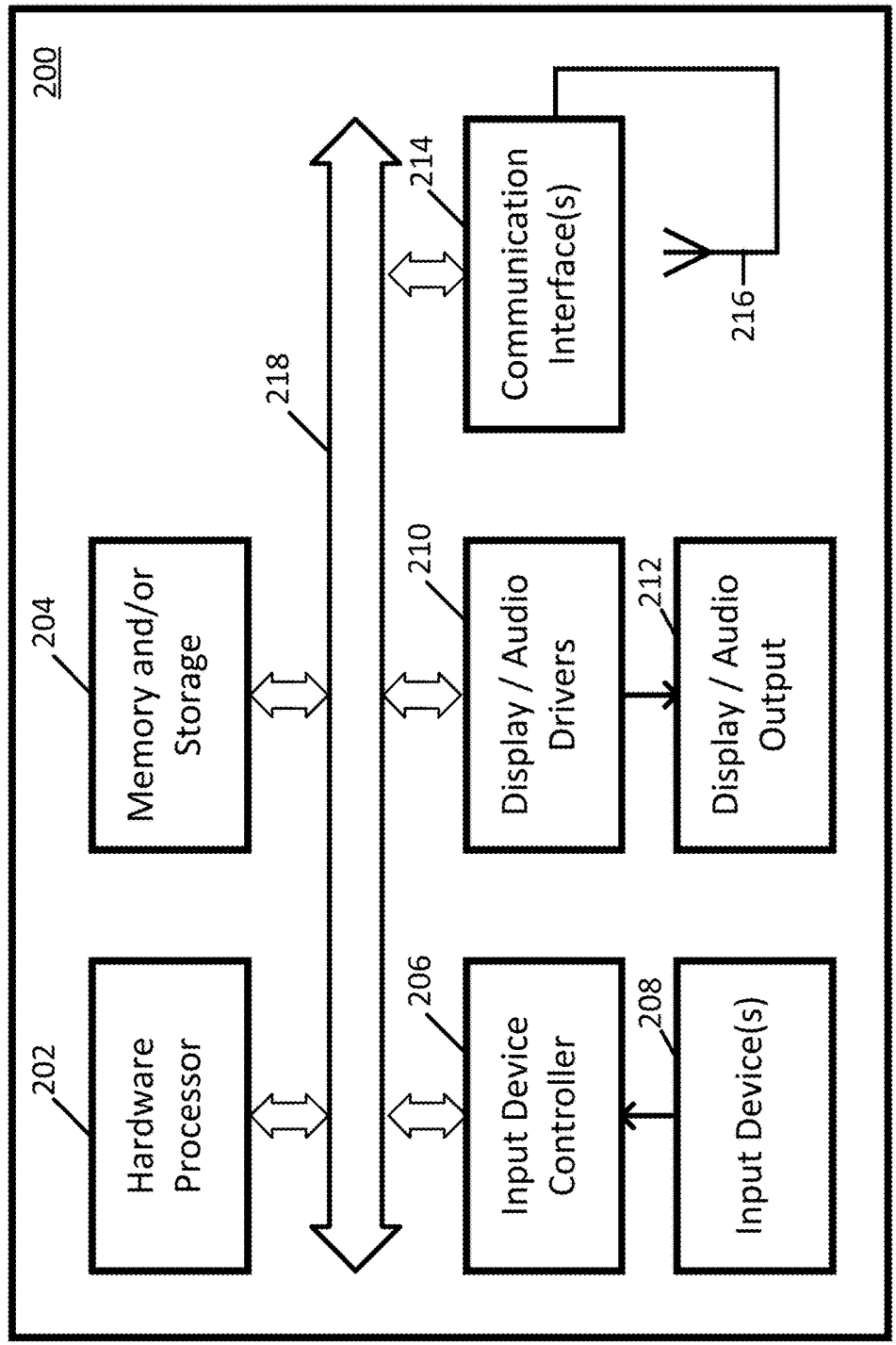
FIG. 2 shows a detailed example of hardware that can be used in a server and/or a user device of FIG. 1 in accordance with some embodiments of the disclosed subject matter.

Sound rating server 102 and user devices 106 can be implemented using any suitable hardware in some embodiments. For example, in some embodiments, devices 102 and 106 can be implemented using any suitable general purpose computer or special purpose computer. For example, a server may be implemented using a special purpose computer. Any such general purpose computer or special purpose computer can include any suitable hardware. For example, as illustrated in example hardware 200 of FIG. 2, such hardware can include hardware processor 202, memory and/or storage 204, an input device controller 206, an input device 208, display/audio drivers 210, display and audio output circuitry 212, communication interface(s) 214, an antenna 216, and a bus 218.

Hardware processor 202 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 202 can be controlled by a server program stored in memory and/or storage 204 of a server (e.g., such as server 102). For example, the server program can cause hardware processor 202 to store received sound level readings, identify sound level readings related to a request for sound level information, aggregate sound level readings related to the request for sound information, and/or perform any other suitable actions. In some embodiments, hardware processor 202 can be controlled by a computer program stored in memory and/or storage 204 of sound information transmitting device 108. For example, the computer program can cause hardware processor 202 to record a sound level reading and transmit the sound level reading to sound rating server 102, as described below in connection with FIG. 3. In some embodiments, hardware processor 202 can be controlled by a computer program stored in memory and/or storage 204 of sound information requesting device 110. For example, the computer program can cause hardware processor 202 to request sound level information related to a particular location and to present the sound level information in a user interface, such as in a map, a list, and/or in any other suitable format, as described below in connection with FIG. 3.

Memory and/or storage 204 can be any suitable memory and/or storage for storing programs, data, media content, and/or any other suitable information in some embodiments. For example, memory and/or storage 204 can include random access memory, read-only memory, flash memory, hard disk storage, optical media, and/or any other suitable memory.

Input device controller 206 can be any suitable circuitry for controlling and receiving input from one or more input devices 208 in some embodiments. For example, input device controller 206 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field communication sensor, and/or any other type of input device.

Display/audio drivers 210 can be any suitable circuitry for controlling and driving output to one or more display/audio output devices 212 in some embodiments. For example, display/audio drivers 210 can be circuitry for driving a touchscreen, a flat-panel display, a cathode ray tube display, a projector, a speaker or speakers, and/or any other suitable display and/or presentation devices.

Communication interface(s) 214 can be any suitable circuitry for interfacing with one or more communication networks, such as network 104 as shown in FIG. 1. For example, interface(s) 214 can include network interface card circuitry, wireless communication circuitry, and/or any other suitable type of communication network circuitry.

Antenna 216 can be any suitable one or more antennas for wirelessly communicating with a communication network (e.g., communication network 104) in some embodiments. In some embodiments, antenna 216 can be omitted.

Bus 218 can be any suitable mechanism for communicating between two or more components 202, 204, 206, 210, and 214 in some embodiments.

Any other suitable components can be included in hardware 200 in accordance with some embodiments.

Figure 3:
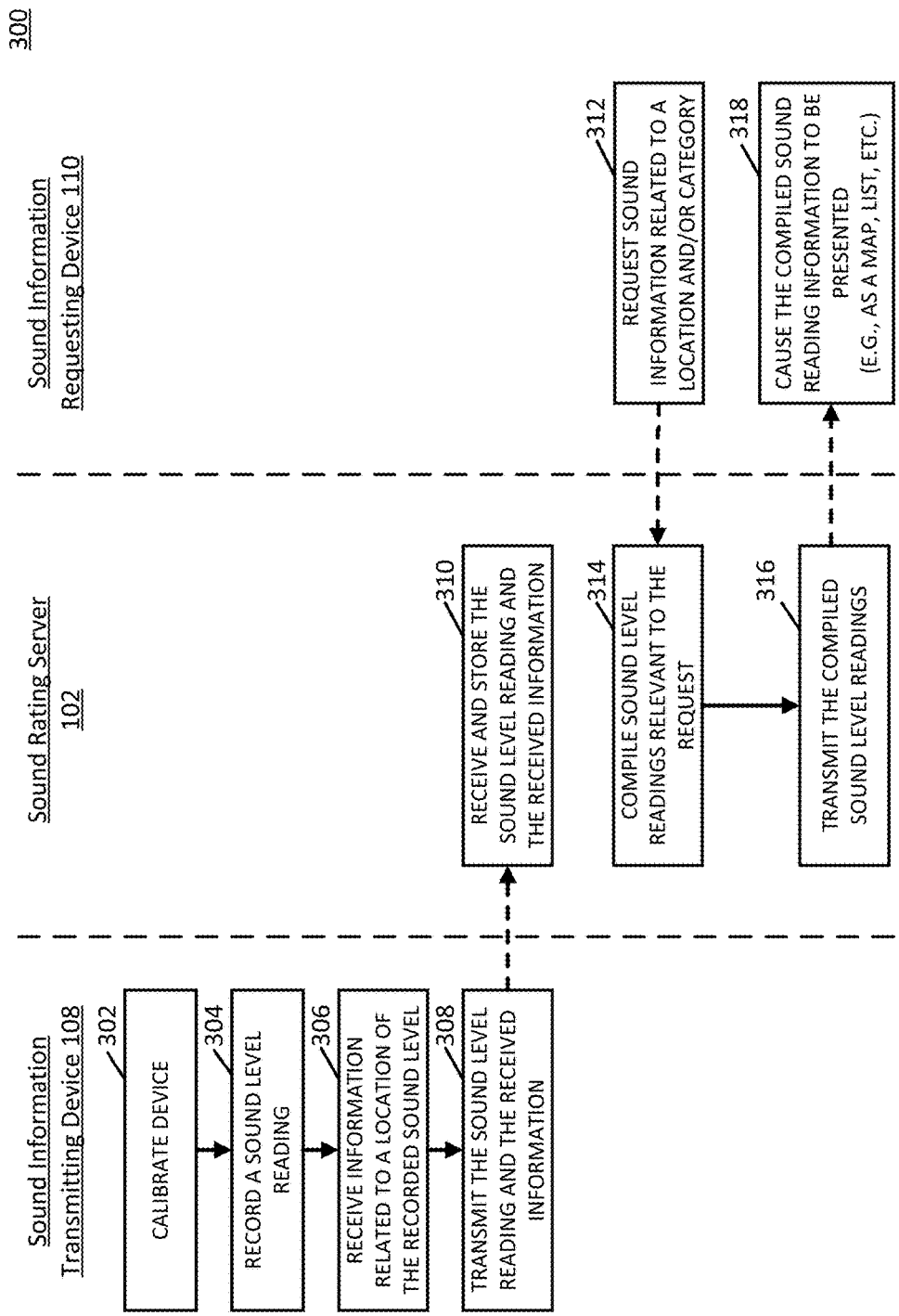
FIG. 3 shows an example of an information flow diagram for providing sound level information for a particular location in accordance with some embodiments of the disclosed subject matter.

Turning to FIG. 3, an example 300 of an information flow diagram for providing sound level information related to a particular location is shown in accordance with some embodiments of the disclosed subject matter. In some embodiments, blocks of information flow diagram 300 can be implemented on sound rating server 102, sound information transmitting device 108, and sound information requesting device 110. Note that although two user devices, one for transmitting sound information (that is, sound information transmitting device 108) and one for requesting sound information (that is, sound information requesting device 110) are shown in FIG. 3, in some embodiments, a single user device can be used for both transmitting and requesting sound information.

Figure 5B:
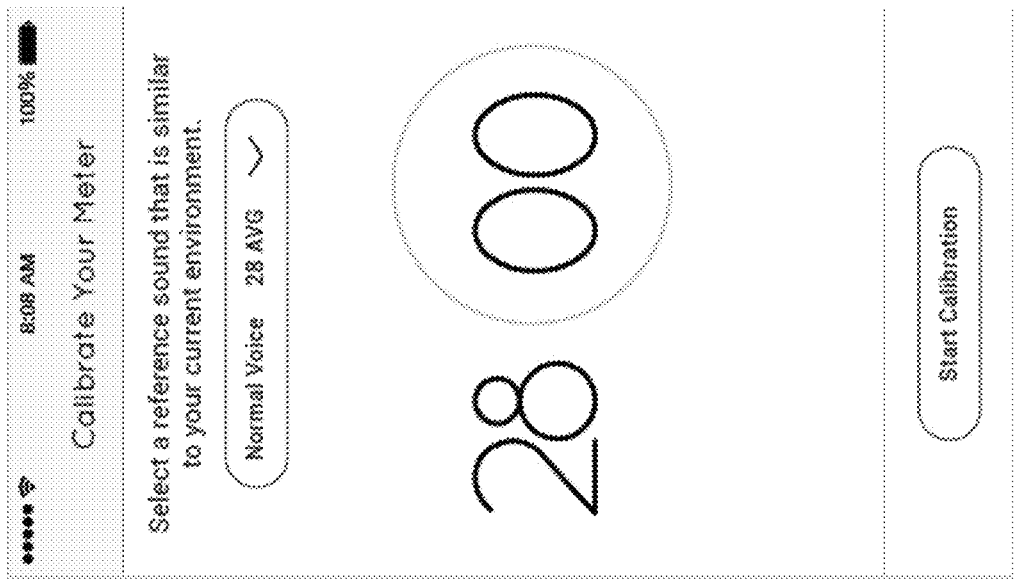
FIGS. 5A-5D show examples of user interfaces for calibrating sound level readings on a user device in accordance with some embodiments of the disclosed subject matter.
Figure 5A:
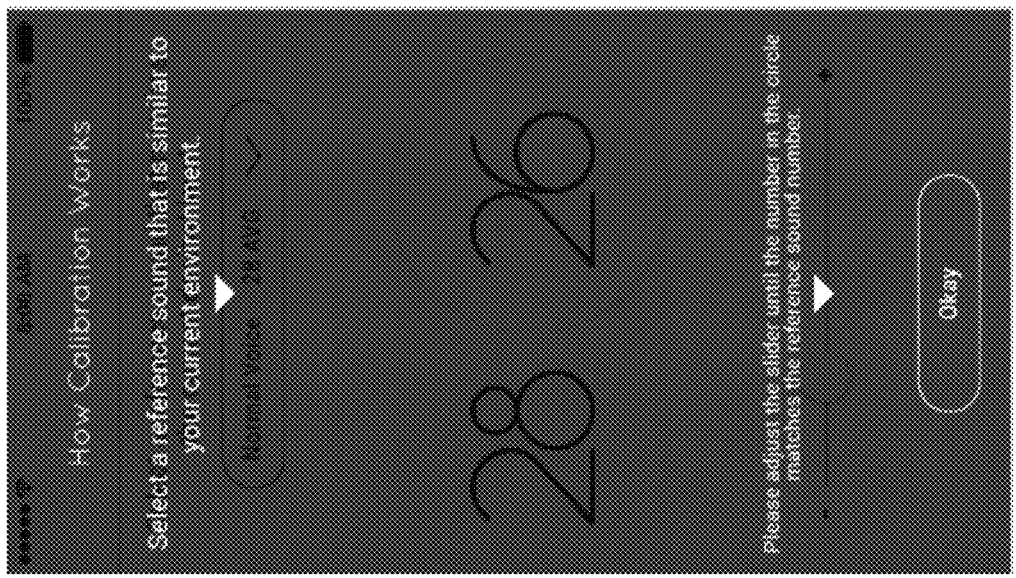
Figure 5C:
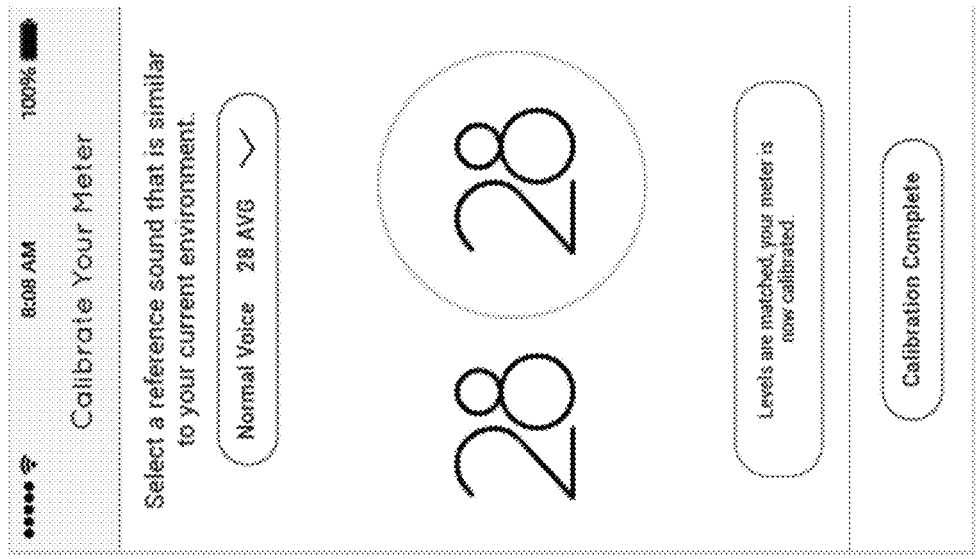
Figure 5D:
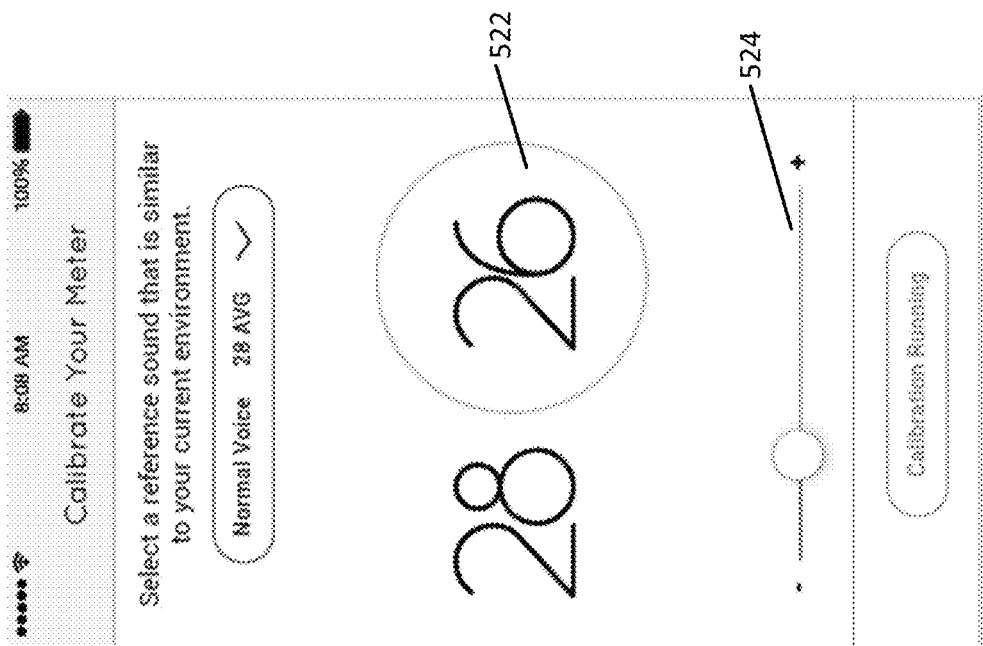

At 302, sound information transmitting device 108 can perform a calibration for sound level readings using any suitable technique(s). For example, in some embodiments, sound information transmitting device 108 can use a microphone to measure ambient noises, and can convert the recorded noises to any suitable sound level scale (e.g., decibels (dB), dB(A), dB Sound Pressure Level (SPL), dB(C), and/or any other suitable sound level scale). As a more particular example, in some embodiments, a user of sound information transmitting device 108 can be prompted to select a reference sound level (e.g., quiet, normal conversational volume, a crowded restaurant, and/or any other suitable reference sound) similar to a sound level in their current environment as shown in FIGS. 5A and 5B. The user can then initiate calibration (e.g., via a selectable input on a user interface used for the calibration procedure as shown in FIG. 5B), and sound information transmitting device 108 can begin recording ambient noise. A sound level reading corresponding to the reference sound level can be displayed (e.g., as shown in FIG. 5C), and the user can be prompted to adjust a slider (e.g., slider 524 in FIG. 5C) until a current sound level reading (e.g., current sound level reading 522 in FIG. 5C) matches the reference sound level (as shown in FIG. 5D). Sound information transmitting device 108 can determine that the calibration procedure is finished when the current sound level reading (as adjusted by the user using, for example, a slider) matches the reference sound level reading.

Note that, in some embodiments, any other suitable calibration technique(s) can be performed. For example, in some embodiments, sound information transmitting device 108 can perform an automated calibration routine. As a more particular example, in some embodiments, sound information transmitting device 108 can convert a measured sound pressure to decibels using calibration information (e.g., one or more equations, a look-up table, and/or using any other suitable calibration information) particular to a type of device (e.g., a device model number, a model number of a microphone associated with the device, and/or any other suitable device information) corresponding to sound information transmitting device 108.

Figure 6B:
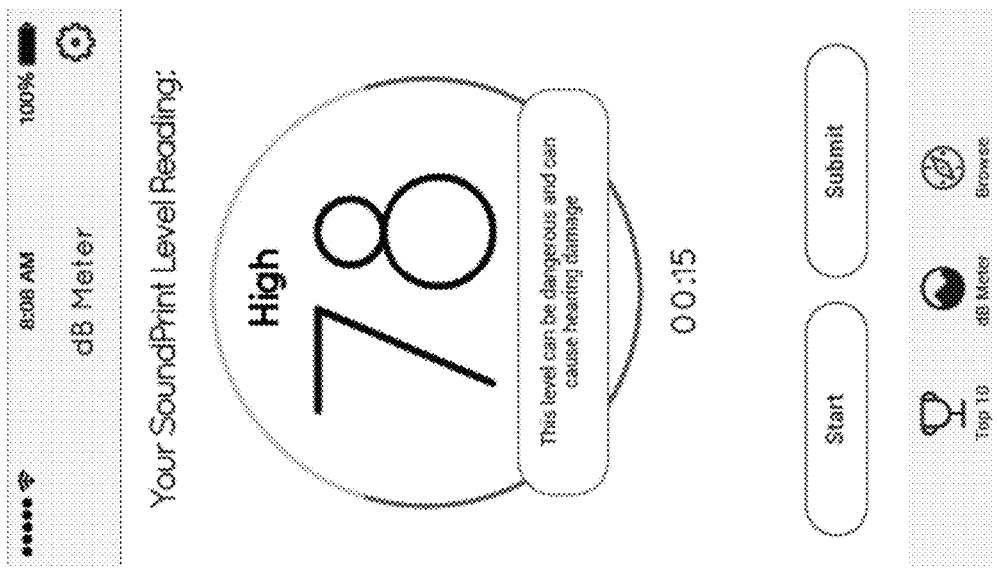
FIGS. 6A-6B show examples of user interfaces for recording a sound level reading on a user device in accordance with some embodiments of the disclosed subject matter.
Figure 6A:
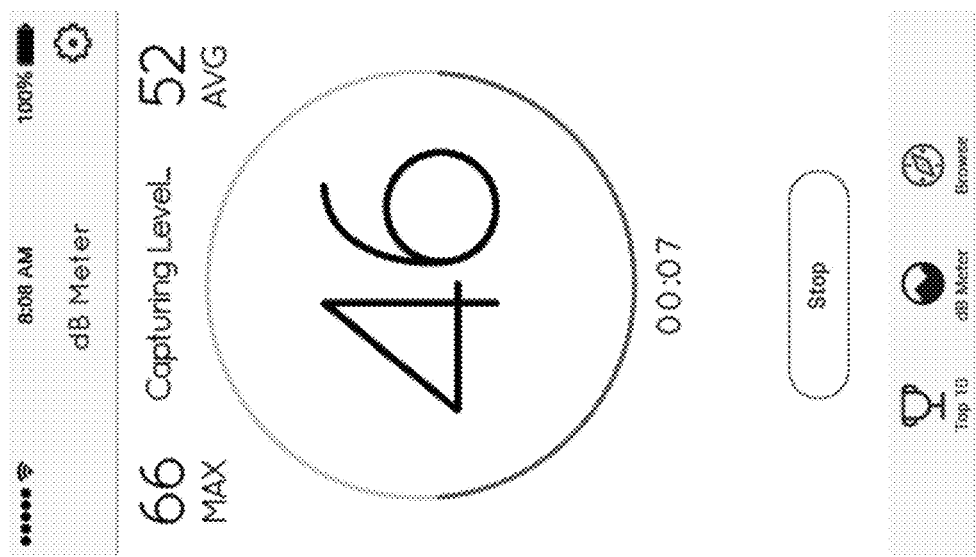

At 304, sound information transmitting device 108 can record a sound level reading at a particular location. For example, sound information transmitting device 108 can record ambient noise from inside a building (e.g., inside a restaurant, inside a coffee shop, inside a bar, and/or inside any other suitable location), in an outside environment (e.g., outside a building, in a park, outside a construction area, and/or any other suitable outside environment), and/or in any other suitable location. Sound information transmitting device 108 can then calculate a sound level reading (e.g., a volume in decibels, and/or any other suitable intensity scale) associated with the recorded noise. In some embodiments, the sound can be recorded for any suitable duration (e.g., five seconds, ten seconds, and/or any other suitable duration). Note that, in some embodiments, process 300 can require that sound be recorded for more than a minimum duration of time (e.g., more than five seconds, more than ten seconds, more than fifteen seconds, and/or any other suitable duration). In some embodiments, the calculated sound level can correspond to any suitable portion of the recorded sound. For example, in some embodiments, the calculated sound level can indicate a mean sound level reading over the duration of the recording, a maximum sound level over the duration of the recording, a minimum sound level over the duration of the recording, and/or any other suitable metric. FIGS. 6A and 6B show examples of user interfaces that can be presented by sound information transmitting device 108 during a sound level reading. In some embodiments, sound information transmitting device 108 can calculate and/or record information related to the sound level reading, such as a maximum recorded sound level, an average recorded sound level, a duration of the sound level reading, a day of the week and/or time of day of the sound level reading, and/or any other suitable information.

In some embodiments, sound information transmitting device 108 can begin recording the sound in response to a user input initiating the sound level reading. For example, in some embodiments, a user of sound information transmitting device 108 can select an input on a user interface presented on sound information transmitting device 108 that, when selected, causes sound information transmitting device 108 to begin recording sound from a microphone associated with sound information transmitting device 108. Additionally or alternatively, in some embodiments, sound information transmitting device 108 can begin recording the sound without an explicit user input. For example, in some embodiments, sound information transmitting device 108 can begin recording the sound in response to determining that the calibration procedure described above in connection with block 302 has finished. As another example, in some embodiments, sound information transmitting device 108 can begin recording the sound in response to determining that sound information transmitting device 108 is at a particular location. As a more particular example, in some embodiments, sound information transmitting device 108 can determine that sound information transmitting device is at a particular location (e.g., a restaurant, a coffee shop, a particular store, and/or any other suitable location) based on any suitable information (e.g., GPS coordinates, and/or any other suitable information), and can automatically begin recording the sound. In some such embodiments, sound information transmitting device 108 can then automatically transmit the sound level reading after it is recorded in connection with an identifier of the location. Note that, in embodiments where sound information transmitting device 108 records sounds and/or transmits sound level readings without explicit user input, sound information transmitting device 108 can request permission from the user (e.g., through a user interface for setting and/or modifying parameters associated with an application recording sounds and transmitting sound level readings) to do so.

Note that, in some embodiments, if the sound level reading is greater than a predetermined threshold (e.g., greater than 80 dB, greater than 90 dB, and/or any other suitable value), sound information transmitting device 108 can present a user interface indicating that the current environment is particularly loud, and that people in the environment are at risk for hearing damage. Additionally or alternatively, in some embodiments, the user interface can include a link to submit a noise complaint, for example, to a local government agency, to a website that reviews businesses, and/or to any other suitable entity.

In some embodiments, if sound information transmitting device 108 determines that the user has previously been to the current location and has previously recorded a sound level associated with the current location, sound information transmitting device 108 can present the current sound level and can additionally present information indicating whether the current sound level is louder or quieter than the previously recorded sound level.

Figure 7B:
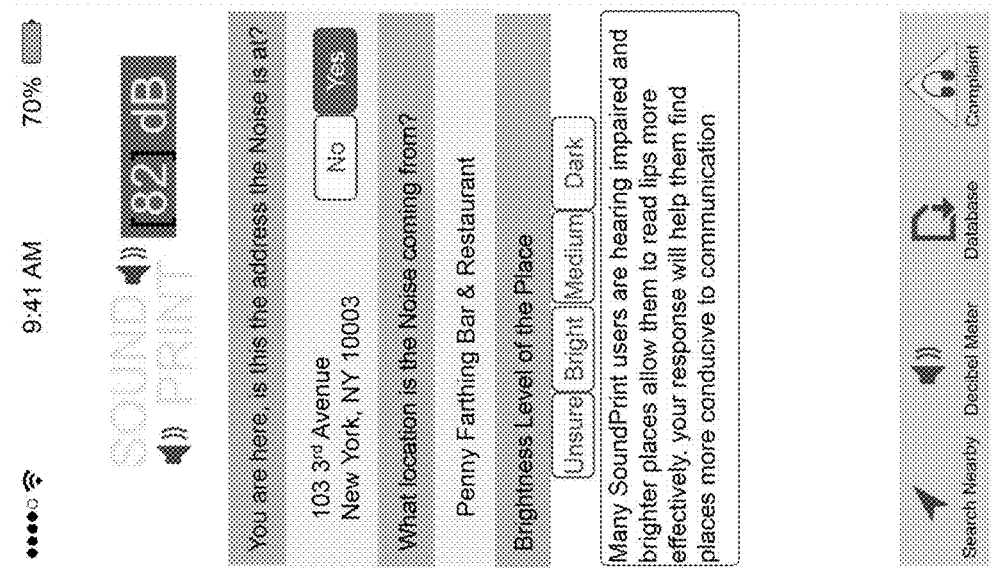
Figure 7A:

At 306, sound information transmitting device 108 can receive information related to a location of the recorded sound level reading. In some embodiments, the information can be received through one or more user interfaces, as shown in FIGS. 7A-7D. For example, in some embodiments, the information can include a name (e.g., a name of a business associated with the location, and/or any other suitable name), intersection, and/or address associated with the location. In some embodiments, in response to receiving an intersection and/or address associated with the location, sound information transmitting device 108 can query any suitable database (e.g., a database of reviews of businesses, a database associated with a local government agency, and/or any other suitable database) to identify names of businesses and/or construction zones associated with the intersection and/or location. A user of sound information transmitting device 108 can then select a particular business name and/or construction zone from the group of identified businesses and/or construction zones, as shown in FIG. 7A. Note that, in some embodiments, sound information transmitting device 108 can determine GPS coordinates and/or any other suitable location information without user input.

As another example, in some embodiments, the received information can additionally indicate a brightness level associated with the location and/or a business associated with the location. For example, as shown in FIG. 7B, a user interface can be presented on sound information transmitting device 108, which can allow the user to indicate whether the location is generally dark, of medium brightness, bright, and/or of any other suitable brightness level. Additionally or alternatively, in some embodiments, the brightness level can be determined using a brightness sensor and/or information from a camera of sound information transmitting device 108.

Figures 7C, 7D:
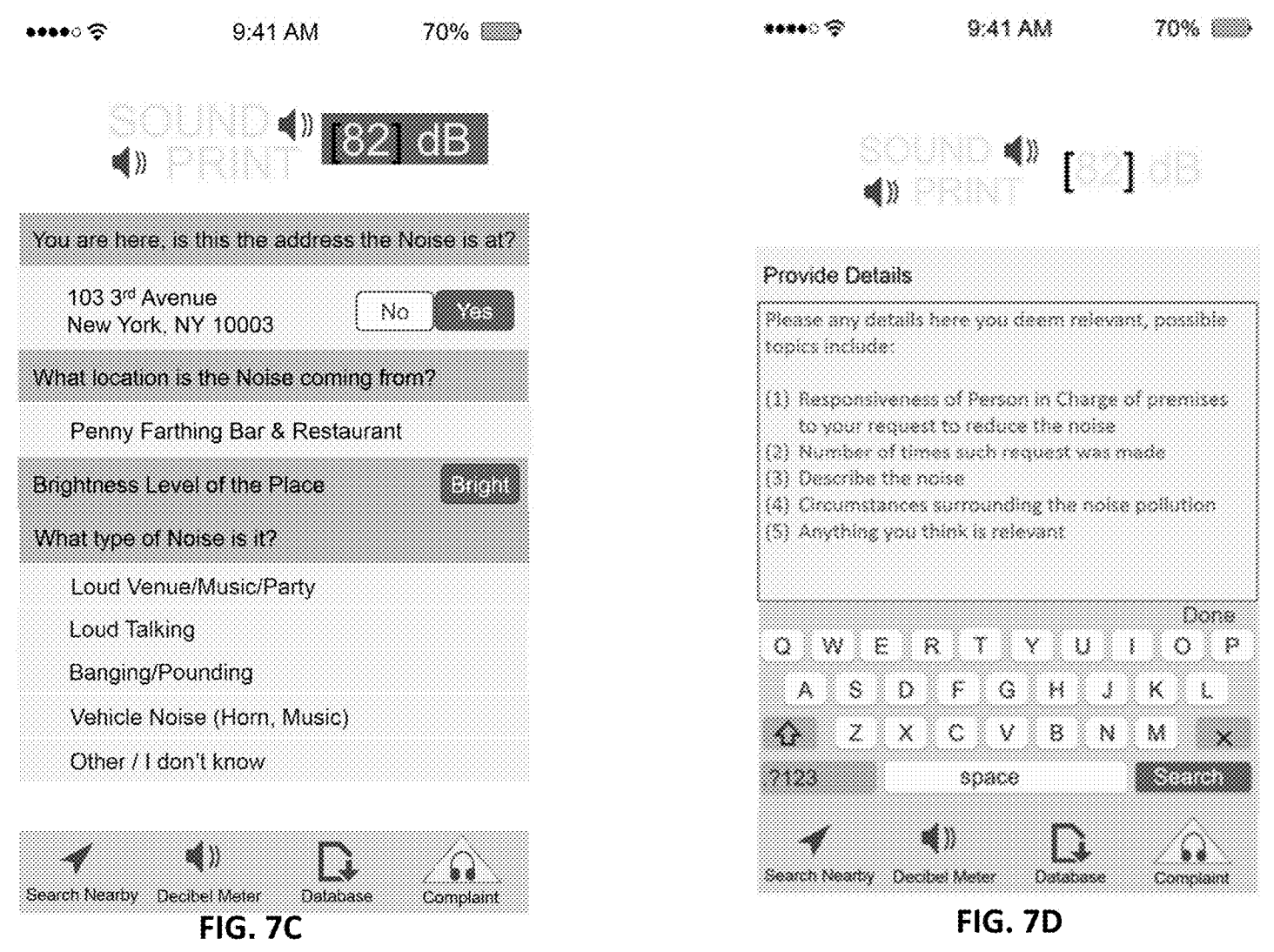

As yet another example, in some embodiments, the received information can indicate a type of noise associated with the location and the sound level reading. For example, as shown in FIG. 7C, the type of noise, an intensity of the noise, and/or a frequency of the noise can indicate whether the noise is music, a party, conversation, noises associated with children and/or babies (e.g., crying), noises associated with construction, vehicle noise, and/or any other suitable type of noise. In some embodiments, any suitable number (e.g., one, two, five, and/or any other suitable number) of types of noise can be selected. Additionally or alternatively, in some embodiments, the type of noise can be determined using pattern recognition and/or any other suitable techniques.

In some embodiments, any other suitable information can be provided. For example, as shown in FIG. 7D, any suitable text related to the recorded sound level reading and/or the location can be entered. For example, in some embodiments, the text can indicate that the user complained about the noise level to a manager and/or owner of a business associated with the location. As another example, in some embodiments, the text can indicate a time of day at which the sound level reading was recorded. Additionally or alternatively, in some embodiments, the time of day can be determined without user input, as described above in connection with block 304.

Note that, although sound information transmitting device 108 is described herein as determining a sound level and transmitting the sound level and any associated information to sound rating server 102, in some embodiments, the recorded sound can be transmitted to sound rating server 102 for processing. In some such embodiments, sound rating server 102 can analyze (e.g., using pattern recognition and/or any other suitable techniques) the recorded sound to determine a sound level, one or more types of noise (e.g., conversation, crying babies, music, construction noises, vehicle noises, and/or any other suitable types of noise) present in the recorded sound, one or more intensities and/or frequencies of noise present in the recorded sound, and/or any other suitable information. Additionally or alternatively, in some embodiments, sound rating server 102 can estimate how crowded a particular location is based on the sound level and/or a number of voices detected in the recorded sound.

Figure 7F:
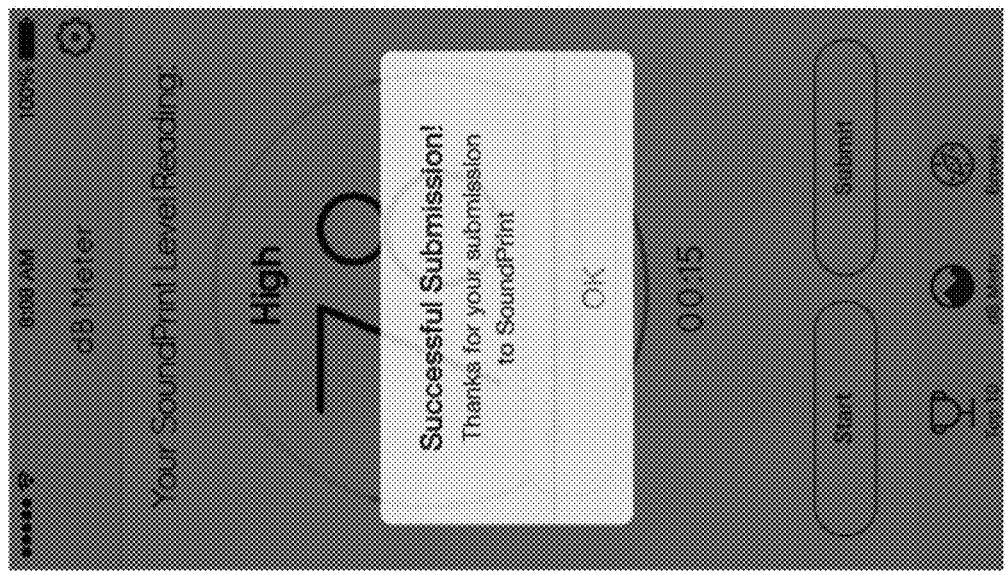
Figure 7E:
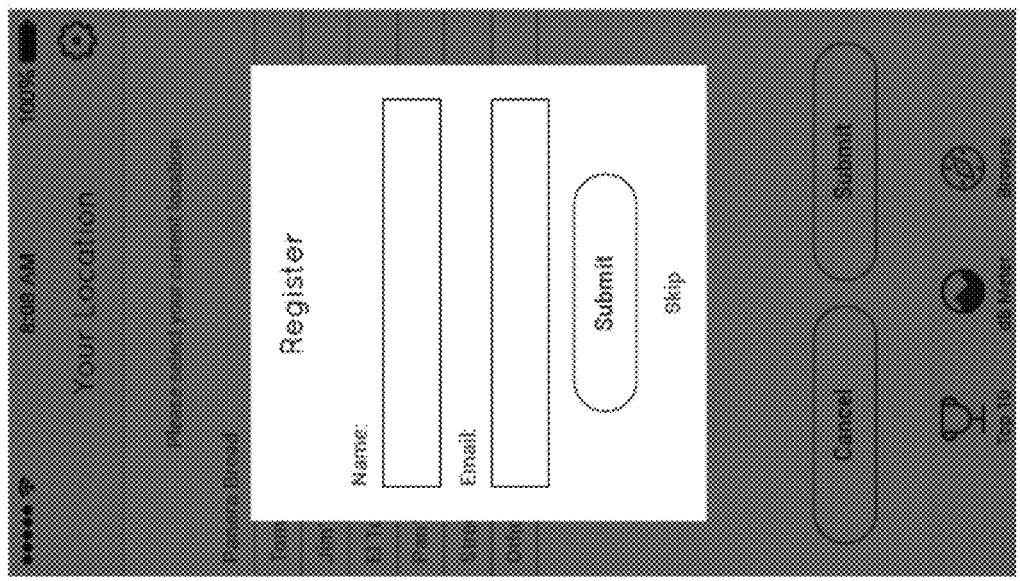

At 308, sound information transmitting device 108 can transmit the sound level reading, any information calculated and/or recorded in connection with the sound level reading, and the received information to sound rating server 102. As shown in FIG. 7E, in some embodiments, the sound level reading and the received information can be transmitted in association with a username and/or email address associated with a user of sound information transmitting device 108. In some embodiments, the sound level reading and the received information can be transmitted in association with any other suitable identifier of a user associated with sound information transmitting device 108, such as a touch print (e.g., a fingerprint), voice recognition data (e.g., acoustic signatures of a user's voice, and/or any other suitable voice recognition data), biometric data, and/or any other suitable identifier(s). Additionally or alternatively, in some embodiments, the sound level reading and the received information can be transmitted anonymously, that is, without indicating any identifiers associated with sound information transmitting device 108. In some embodiments, as shown in FIG. 7F, a user interface indicating successful transmission of the sound level reading and the received information can be presented on sound information transmitting device 108.

Note that, in some embodiments, a user of sound information transmitting device 108 can choose to store the sound level reading and any associated information (e.g., a name associated with the location, a time of day, a review and/or rating of a business associated with the sound level reading, and/or any other suitable information) locally on sound information transmitting device 108 (e.g., in memory 204 of sound information transmitting device). For example, in some embodiments, the sound level reading and the associated information can be stored in a personal database stored on sound information transmitting device 108, which can be accessed at any time (e.g., when sound information transmitting device 108 is offline and/or does not have Internet access, and/or at any other suitable time) by a user of sound information transmitting device 108. In some such embodiments, the sound level reading and the associated information can be stored locally on sound information transmitting device 108 instead of or in addition to transmitting the sound level reading and the associated information to sound rating server 102.

At 310, sound rating server 102 can receive and store the sound level reading and the information in connection with an identifier of the location (e.g., an address associated with the location, a name of a business associated with the location, an intersection associated with the location, and/or any other suitable identifier). Sound rating server 102 can use any suitable technique or combination of techniques to store the information, as described below in connection with block 404 of FIG. 4.

At 312, sound information requesting device 110 can request sound level information related to a particular location and/or category (e.g., restaurants, coffee shops, bars, bookstores, parks, and/or any other suitable category). For example, in some embodiments, sound information requesting device 110 can request sound level information for restaurants near a particular location (e.g., within a particular zip code, within a particular city, near a particular intersection, and/or any other suitable particular location). As a more particular example, sound information requesting device 110 can request sound level information for restaurants that serve a particular type of cuisine that are located in a particular zip code. FIG. 8 shows an example of a user interface that can be presented on sound information requesting device 110 for requesting sound level information related to a particular location and/or category.

At 314, sound rating server 102 can receive the request and can compile sound level readings that are determined to be relevant to the request. For example, if the request is for sound level information for businesses corresponding to a particular category and in a particular location, sound rating server 102 can identify businesses of the particular category that are in and/or near the particular location, and can compile sound level readings that have been received (e.g., from sound information transmitting device 108) for those businesses. As a more particular example, if the request is for sound information for coffee shops in a particular zip code, sound rating server 102 can identify multiple coffee shops in the particular zip code, and can compile the identified sound level readings for each coffee shop. Sound rating server 102 can use any suitable technique or combination of techniques to compile the sound level readings, as described below in connection with block 410 of FIG. 4. Note that, in some embodiments, sound rating server 102 can identify any suitable number (e.g., zero, one, two, five, ten, twenty, and/or any other suitable number) of sound level readings to compile based on the category and/or the location. Additionally, in instances where sound rating server 102 does not identify any sound level readings corresponding to the particular category and/or the particular location (e.g., because no sound level readings corresponding to the particular category and/or the particular location have been submitted), sound rating server 102 can transmit a message to sound information requesting device 110 indicating that no relevant sound level readings were identified.

At 316, sound rating server 102 can transmit the compiled sound level information to sound information requesting device 110. In some embodiments, the transmitted information can additionally include instructions for presentation of the sound level information to be executed by sound information requesting device 110. For example, in some embodiments, the instructions can be used by sound information requesting device 110 to present the received sound information in a list, in a map, and/or in any other suitable manner, as described below in connection with block 318.

At 318, sound information requesting device 110 can cause the compiled sound level information to be presented using any suitable scale (e.g., in dB, in dB(A), in dB(C), in dB SPL, using a proprietary scale, and/or in any other suitable manner). For example, in some embodiments, a proprietary scale that assigns a sound level rating from a sound level reading can be used. As a more particular example, in some embodiments, the rating can be assigned based on whether the sound level reading is included in a particular range. As a specific example, sound level readings below a predetermined threshold (e.g., below 65 dB, and/or any other suitable value) can be assigned a rating of "quiet," and/or any other suitable rating. As another specific example, sound level readings within a particular range (e.g., between 65 dB and 75 dB, and/or any other suitable range) can be assigned a rating of "medium," and/or any other suitable rating. As yet another specific example, sound level readings above a predetermined threshold (e.g., 75 dB, and/or any other suitable value), can be assigned a rating of "loud," and/or any other suitable rating. Note that, in some embodiments, any suitable number (e.g., two, five, ten, and/or any other suitable number) of ratings can be used. Additionally or alternatively, in some embodiments, ratings can be assigned a corresponding color-code, for example, blue to indicate a rating of "quiet," yellow to indicate a rating of "medium," and red to indicate a rating of "loud."

Figure 11:
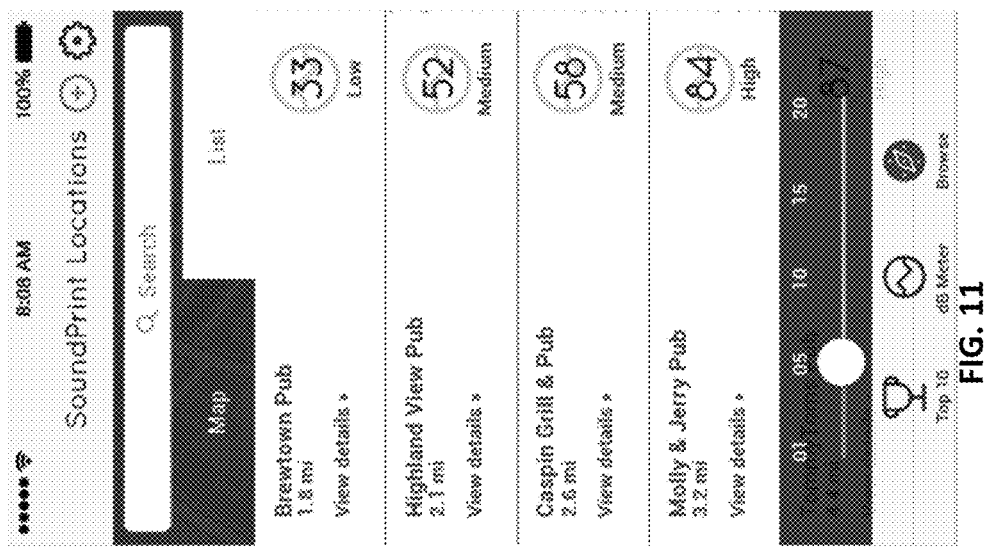
FIG. 11 shows an example of a user interface for presenting sound level information in a list in accordance with some embodiments of the disclosed subject matter.

The compiled sound level information can be presented in any suitable manner. For example, as shown in FIG. 9, the sound information can be presented in a list of the top N businesses with the lowest aggregate sound level readings (e.g., as measured multiple times by different user devices). In some embodiments, a top N list can be compiled for businesses and/or locations of a particular category (e.g., top N quietest restaurants in New York City, top N quietest coffee shops in a particular zip code, top N noisiest restaurants, top N medium sound-level restaurants, top N highly-rated quiet restaurants, top N highly-rated noisy restaurants, and/or any other suitable category). Note that, in instances where a particular category for a top N list includes both sound levels and quality ratings, information from sound rating server 102 can be cross-referenced with information from any suitable external database that indicates reviews and/or ratings for particular businesses. As shown in FIG. 9, in some embodiments, each entry in the list of top N businesses can indicate a distance of sound information requesting device 110 to the business and/or an aggregate sound level reading associated with the business. In some embodiments, any other suitable information can be displayed in each entry, such as a general rating (e.g., 4 out of 5 stars, and/or any other suitable rating) associated with the business, an address of the business, public transit available near the business, and/or any other suitable information. In some embodiments, a list of businesses can be sorted based on any other suitable information. For example, as shown in FIG. 11, in some embodiments, the list of businesses can be sorted and presented based on distance of sound information requesting device 110 to the business.

Figure 10B:
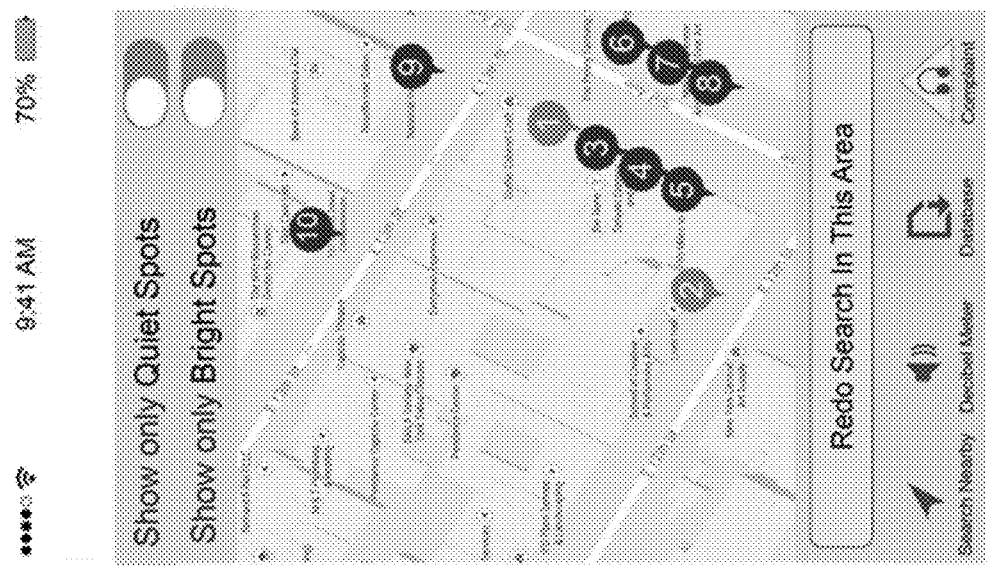
FIGS. 10A-10C show examples of user interfaces for presenting sound level information in a map interface in accordance with some embodiments of the disclosed subject matter.
Figure 10A:
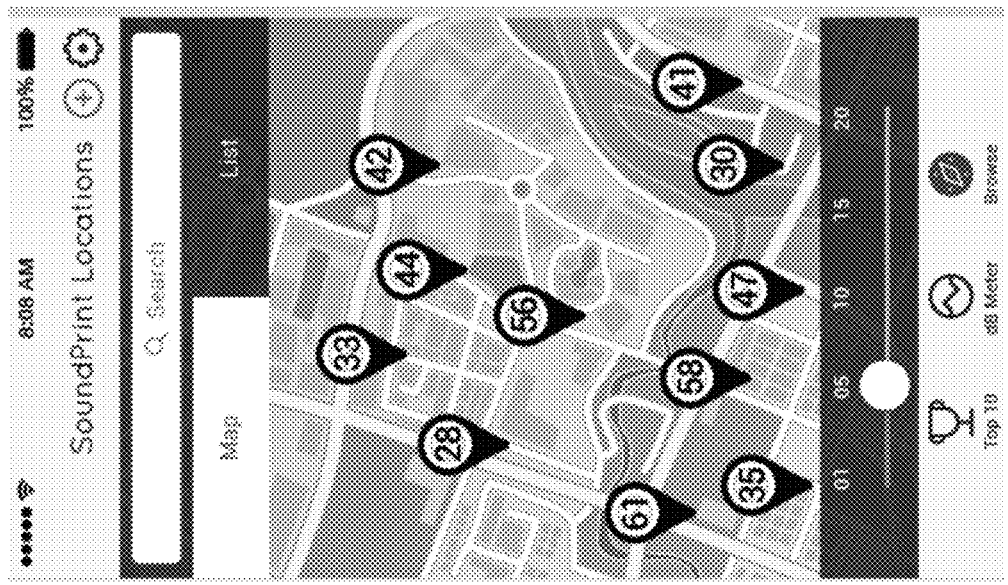
Figure 10C:
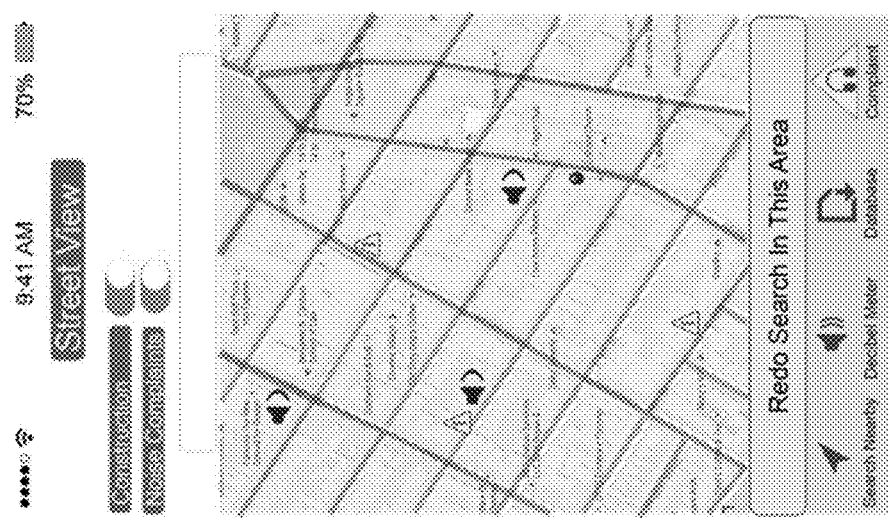

As another example, in some embodiments, sound information requesting device 110 can cause the received sound information to be presented in a map, as shown in FIGS. 10A-10C. For example, in some embodiments, aggregate sound level readings associated with different businesses can be presented, where each business is indicated by a marker on a map, as shown in FIG. 10A. As another example, in some embodiments, businesses represented in the map can be filtered based on any suitable criteria. As a more particular example, in some embodiments, businesses indicated on the map can be filtered to show only businesses with aggregate sound level readings below a predetermined threshold (e.g., below 65 dB, and/or any other suitable sound level), as shown in FIG. 10B. As another more particular example, in some embodiments, businesses indicated on the map can be filtered to show only businesses with aggregate sound level readings above a predetermined threshold (e.g., above 65 dB, and/or any other suitable sound level). As yet another more particular example, in some embodiments, businesses indicated on the map can be filtered to show only businesses that are of a particular brightness level, as shown in FIG. 10B. Note that, in some embodiments, multiple filtering criteria (e.g., businesses with aggregate sound level readings below a predetermined threshold, businesses of a particular brightness level, businesses associated with at least a predetermined rating, and/or any other suitable criteria) can be applied at one time. As yet another example, in some embodiments, locations with noise complaints and/or nearby construction can be indicated on a map, as shown in FIG. 10C. In some embodiments, locations with businesses that are associated with sound level readings within a particular range, locations with noise complaints, and locations associated with construction can each be presented in a map with a different marker, as shown in FIGS. 10A-10C.

In some embodiments, a map can be presented which indicates aggregate sound level readings for particular blocks of a geographic region. For example, in some embodiments, the map can color-code particular streets and/or blocks based on aggregated sound level readings received from those streets and/or blocks. As a specific example, the map can present a street that is associated with sound level readings below a predetermined threshold (e.g., 65 dB, and/or any other suitable value) in green, and a street that is associated with sound level readings above a predetermined threshold (e.g., 80 dB, and/or any other suitable value) in red. In some embodiments, the aggregated sound level readings can be an average and/or weighted average of sound level readings from businesses and/or locations associated with the street and/or block.

Figure 12B:
FIGS. 12A-12B show examples of user interfaces for presenting additional information about a particular business and/or location in accordance with some embodiments of the disclosed subject matter.
Figure 12A:
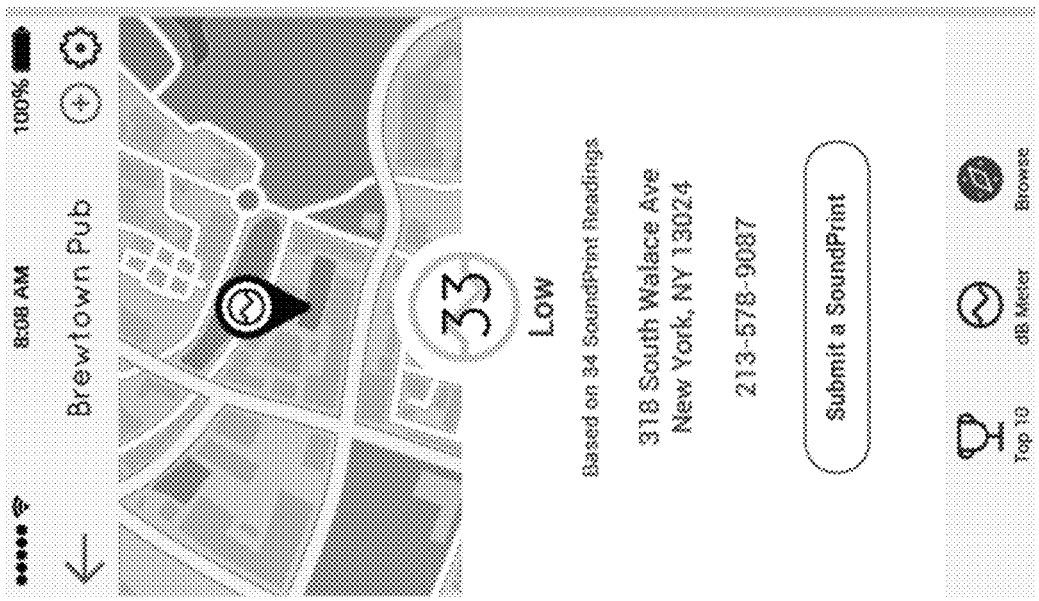

In some embodiments, selection of a particular business and/or noise complaint (e.g., from a list and/or from a map) can cause additional information about the business and/or noise complaint to be presented in a user interface on sound information requesting device 110. For example, as shown in FIG. 12A, selection of a particular business can cause information indicating a number of sound level readings associated with the business, an address associated with the business, a phone number associated with the business, and/or any other suitable information to be presented. As another example, as shown in FIG. 12B, selection of a marker indicating a noise complaint can cause information indicating recorded sound level readings at different times of day, information indicating a number of noise complaints received within a predetermined period of time (e.g., within the last week, within the last month, and/or any other suitable time period), information indicating a reason for the noise (e.g., proximity to a nearby fire station, proximity to a construction zone, proximity to a subway and/or train line, and/or any other suitable reason), and/or any other suitable information to be presented.

Note that, in some embodiments, the additional information can include links to any other suitable websites and/or applications. For example, in instances where the business is a restaurant, the additional information can include links to a website and/or application that presents reviews of restaurants, links to a website and/or application that allows a user to make a reservation for a restaurant, and/or any other suitable websites and/or application. As another example, in some embodiments, the websites and/or applications can include those that provide real estate listings, and/or any other suitable websites and/or applications.

Figure 4:
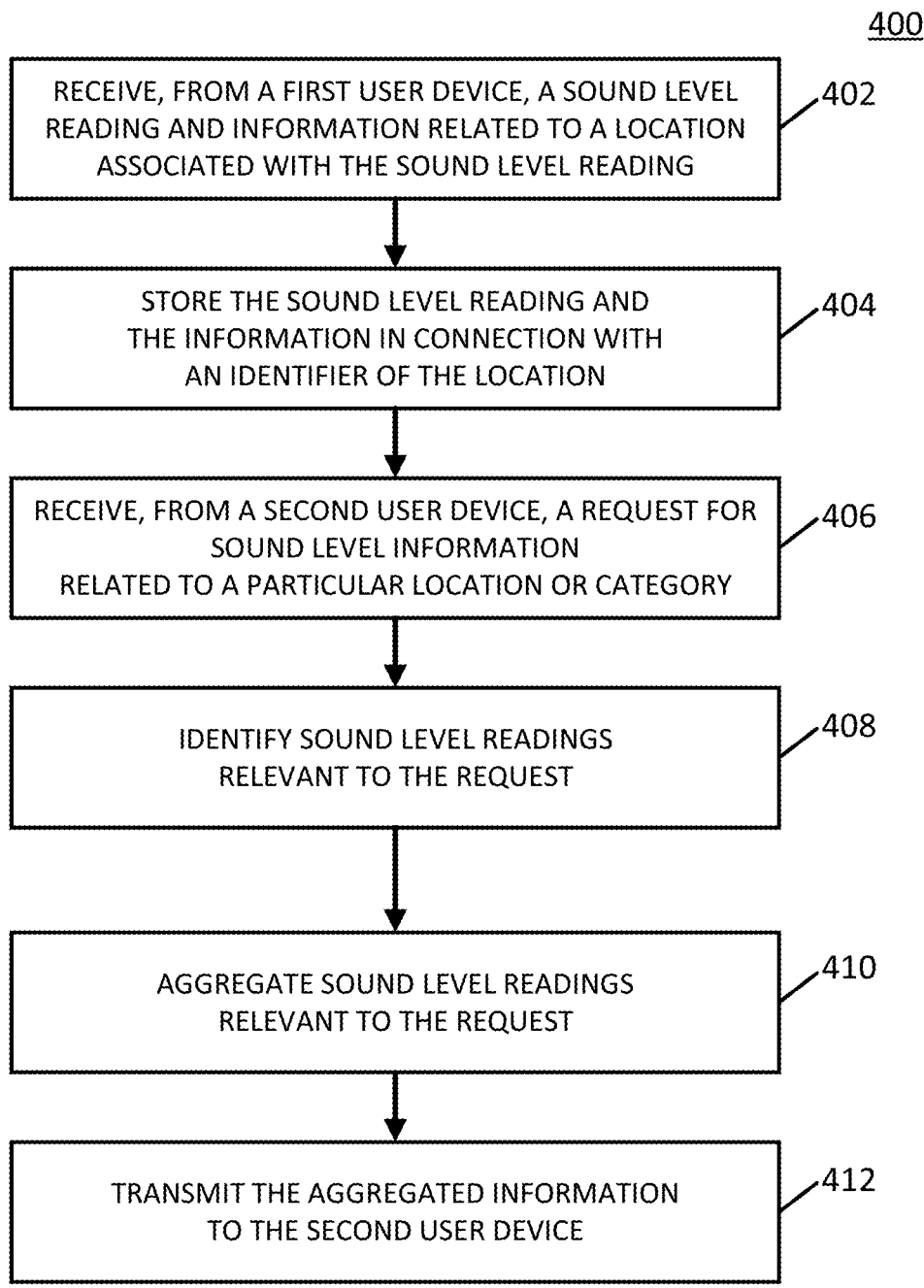
FIG. 4 shows an example of a process for receiving a sound level reading from a first user device and providing sound level information to a second user device in response to a request in accordance with some embodiments of the disclosed subject matter.

Turning to FIG. 4, an example 400 of a process for receiving a sound level reading from a first user device (e.g., sound information transmitting device 108) and providing sound level information to a second user device (e.g., sound information requesting device 110) in response to a request is shown in accordance with some embodiments of the disclosed subject matter. In some embodiments, blocks of process 400 can be executed by sound rating server 102.

Process 400 can begin by receiving, from a first user device (e.g., sound information transmitting device 102), a sound level reading and information related to the sound level reading at 402. As described above in connection with blocks 304-308 of FIG. 3, the sound level reading can be of any suitable duration, and the associated information can include any suitable information about a location associated with the sound level reading and/or the noise associated with the sound level reading. For example, in some embodiments, the information can indicate a name of a business associated with the location, an intersection and/or address associated with the location, details about a type of noise (e.g., construction noise, music, conversation, and/or any other suitable type of noise) associated with the sound level reading, information indicating interactions with a manager and/or owner of the business, a date and/or time of day at which the sound level reading was obtained, and/or any other suitable information.

Process 400 can store the received sound level reading and the information in connection with an identifier of the location at 404. For example, in instances where the location corresponds to a particular business and/or named location (e.g., a restaurant, a coffee shop, a bar, a shop, a park, a playground, and/or any other suitable type of named location), the identifier can include the name of the particular business and/or location. As another example, in instances where the location corresponds to an intersection and/or address (e.g., if the sound level reading corresponds to a construction area, a residential building, and/or any other suitable location), the identifier can include the intersection, the address, GPS coordinates, and/or any other suitable identifying information. In some embodiments, process 400 can store the sound level reading and the information in a database that is searchable by the identifier. For example, in some embodiments, the database can be used to retrieve sound level readings and associated information in response to a query using a particular name of a business, an intersection, an address, and/or any other suitable identifier.

Note that, in some embodiments, process 400 can augment the received information with any other suitable information retrieved from, for example, external databases. For example, if the identifier includes a name of a restaurant, process 400 can access an external database to determine that the restaurant serves a particular type of cuisine, is open on particular days of the week and/or at particular times of day, and/or any other suitable information related to the restaurant, and can store this additional information using the identifier of the location. As another example, in some embodiments, process 400 can access an external database (e.g., associated with a local government agency, and/or any other suitable entity) to determine construction zones and/or noise complaints near the location of the sound level reading, and can determine any relevant information, such as planned dates and/or times for the construction.

Process 400 can receive, from a second user device (e.g., sound information requesting device 110), a request for sound level information related to a particular location and/or category at 406. As described above in connection with block 312 of FIG. 3, the request can include any suitable information. For example, in some embodiments, the request can indicate that a user wants sound level information for a particular type of business (e.g., a particular type of restaurant, a park, a particular type of store, restaurants with a particular average price, and/or any other suitable type of business). As a specific example, in some embodiments, the request can indicate that the user wants sound level information for restaurants that serve a particular cuisine. As another example, in some embodiments, the request can indicate that a user wants sound level information for businesses and/or locations in a particular geographic region (e.g., near a current location of the second user device, in a particular zip code, in a particular city, and/or in any other suitable geographic region). Note that, in some embodiments, the request can include any suitable combination(s) of location and/or category.

Process 400 can identify received sound level readings that are relevant to the received request at 408. For example, in instances where the request indicates a particular category of business and/or particular location (e.g., restaurants that serve a particular type of cuisine, coffee shops within a particular geographic region, and/or any other suitable category and/or location), process 400 can identify businesses that correspond to the indicated category and location. In some embodiments, any suitable number (e.g., one, five, ten, and/or any other suitable number) of businesses can be identified. Process 400 can then retrieve sound level readings corresponding to each of the identified businesses. In some embodiments, any suitable number (e.g., zero, one, two, five, ten, twenty, and/or any other suitable number) of sound level readings received from any suitable number of user devices can be retrieved. Note that, in some embodiments, a particular business or location might have zero associated sound level readings.

Process 400 can aggregate the sound level readings retrieved for each identified business and/or location at 410. For example, for a particular business and/or location, process 400 can average sound level readings associated with the particular business and/or location in any suitable manner. As a more particular example, in some embodiments, the sound level readings can be averaged using a weighted average using any suitable factors, such as a duration of the sound recording associated with the sound level reading, a time of day and/or a day of week associated with the sound level reading, how recently the sound level reading was acquired, a number of sound level readings received in connection with the business and/or location, whether a particular sound level reading was submitted by a user who has previously provided more frequent and/or more reliable sound level reading submissions, and/or any other suitable information. In some embodiments, process 400 can use any suitable subset of the sound level readings corresponding to the business or location to determine an aggregated sound level reading for a particular business and/or location. For example, in some embodiments, process 400 can use only sound level readings that were received within a predetermined time period (e.g., within the last week, within the last month, within the last year, and/or any other suitable time period) and/or that correspond to a particular day of the week and/or time of day (e.g., weekends, after 9 p.m., and/or any other suitable day of the week or time of day). As a more particular example, in some embodiments, process 400 can use only sound level readings that were received on a day of the week and/or at a time of day that is the same as or similar to a day of the week and/or time of day of the request received at block 406.

Note that, in some embodiments, the aggregated sound level readings can be in any suitable scale. For example, in some embodiments, the scale can include dB, dB(A), dB(C), dB SPL, or a proprietary scale. As a more particular example, in some embodiments, the proprietary scale can assign a color code to the sound level reading, as described above in connection with FIG. 3. As another more particular example, in some embodiments, the proprietary scale can convert a sound level reading in a physical measurement (e.g., dB, dB(A), dB(C), dB SPL, and/or any other suitable scale) to a proprietary rating and/or score (e.g., a score from 0 to 1, a score from 1 to 100, a colored score that indicates a general noise level, and/or any other suitable rating and/or score).

Process 400 can transmit the aggregated information to the second user device (e.g., sound information requesting device 110) at 412. In some embodiments, the aggregated information can include sound level information for any suitable number of businesses and/or locations. In some embodiments, the aggregated information can additionally include geographic information (e.g., a distance of the second user device to the business and/or location, an address and/or intersection of the business and/or location, and/or any other suitable geographic information) associated with the businesses and/or locations.

Additionally or alternatively, in some embodiments, process 400 can transmit instructions for presenting the aggregated information on the second user device. For example, in some embodiments, as described above in connection with block 318 of FIG. 3, the instructions can be executed on the second user device and can cause the aggregated information to be presented in any suitable manner, such as in a list, as markers on a map, and/or in any other suitable manner.

Although not described above in connection with FIGS. 3 and 4, in some embodiments, information relating to sound level readings and/or noise complaints associated with a particular business can be accessed by an owner, manager, and/or any other suitable person associated with the business. For example, in some embodiments, the owner and/or manager of the business can access sound level readings submitted over any particular time period (e.g., in the last day, in the last week, in the last month, and/or any other suitable time period) to determine if recorded sound levels are in compliance with regulatory noise threshold levels. As another example, in some embodiments, the owner and/or manager can access any noise complaints submitted, for example, by a user of sound information transmitting device 108. In some such embodiments, the owner and/or manager can submit a response to the noise complaint that can be viewed by the user of sound information transmitting device 108. Additionally or alternatively, in some embodiments, one or more government agencies (e.g., the Department of Health, and/or any other suitable agencies) can have access to the information relating to sound level readings and/or noise complaints to determine if the corresponding businesses are in compliance with regulatory noise threshold levels.

In some embodiments, at least some of the above described blocks of the processes of FIGS. 3 and 4 can be executed or performed in any order or sequence not limited to the order and sequence shown in and described in connection with the figures. Also, some of the above blocks of FIGS. 3 and 4 can be executed or performed substantially simultaneously where appropriate or in parallel to reduce latency and processing times. Additionally or alternatively, some of the above described blocks of the processes of FIGS. 3 and 4 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention. Features of the disclosed embodiments can be combined and rearranged in various ways.

What is claimed is:

1. A method for providing sound level information for a particular location, comprising:

receiving, from a first mobile device of a first user, at least one first sound level reading for a first location of a plurality of locations associated with a geographic region and an identifier of the first location, wherein the at least one first sound level reading was automatically measured by the first mobile device in response to the first mobile device determining that the first mobile device is at a location that matches the first location;

receiving, from a second mobile device of a second user, at least one second sound level reading for a second location of the plurality of locations associated with the geographic region and an identifier of the second location, wherein the at least one second sound level reading was automatically measured by the second mobile device in response to the second mobile device determining that the second mobile device is at a location that matches the second location;

receiving, from a third user device, a request for sound level indications associated with the geographic region;

in response to receiving the request, identifying the plurality of locations associated with the geographic region;

identifying a plurality of sound level readings, wherein, for each location in the plurality of locations, at least one sound level reading of the plurality of sound level readings corresponds to the location and wherein the plurality of sound level readings includes the at least one first sound level reading and the at least one second sound level reading;

generating, for each location in the plurality of locations, a sound level indication based on the at least one sound level reading corresponding to the location; and transmitting at least one of the plurality of sound level indications and an identifier of at least one location in the plurality of locations corresponding to the at least one of the plurality of sound level indications to the third user device.

2. The method of claim 1, further comprising calculating, for each location in the plurality of locations, a composite sound level reading based on matching readings in the plurality of sound level readings corresponding to the location, wherein the matching readings corresponding to the location include the at least one sound level reading corresponding to the location, and wherein the sound level indication generated for each location in the plurality of locations is generated based on the composite sound level reading for the location.

3. The method of claim 1, wherein transmitting the at least one of the plurality of sound level indications and the identifier of the at least one location in the plurality of locations comprises transmitting instructions that cause the at least one of the plurality of sound level indications to be presented in a visual manner that indicates a safety range.

4. The method of claim 1, wherein transmitting the at least one of the plurality of sound level indications and the identifier of the at least one location in the plurality of locations comprises transmitting instructions that cause the at least one of the plurality of sound level indications to be presented in a map.

5. The method of claim 1, wherein transmitting the at least one of the plurality of sound level indications and the identifier of the at least one location in the plurality of locations comprises transmitting instructions that cause the at least one of the plurality of sound level indications to be presented in a list.

6. The method of claim 5, wherein the instructions cause the at least one of the plurality of sound level indications and the identifier of the at least one location in the plurality of locations to be presented in connection with an indicator of a distance between the at least one location and the third user device.

7. The method of claim 1, wherein the at least one sound level reading for each location in the plurality of locations was recorded at a similar time of day as a time of day at which the request from the third user device was received.

8. The method of claim 7, wherein the at least one sound level reading for each location in the plurality of locations was recorded on a different day as a day on which the request from the third user device was received.

9. The method of claim 1, further comprising:
receiving, from the second mobile device, an additional sound level reading corresponding to an additional location;
storing the additional sound level reading in connection with an identifier of the additional location;
generating a noise complaint based on the additional sound level reading, wherein the noise complaint identifies the additional location; and
transmitting the noise complaint to the external database.

10. The method of claim 1, wherein at least one of the plurality of sound level readings is made using a microphone.

11. The method of claim 1, wherein the plurality of locations is associated with a category, and wherein the request received from the third user device indicates the category.

12. The method of claim 1, further comprising selecting a subset of the plurality of locations based on the at least one sound level reading identified for each location in the plurality of locations, wherein the identifier of the at least one location in the plurality of locations transmitted to the third user device corresponds to a location in the subset of the plurality of locations.

13. The method of claim 12, wherein the at least one sound level reading for each location in the subset of the plurality of locations is selected based on a comparison of the at least one sound level reading to a predetermined threshold.

14. A system for providing sound level information for a particular location, the system comprising:
a hardware processor that is programmed to:
receive, from a first mobile device of a first user, at least one first sound level reading for a first location of a plurality of locations associated with a geographic region and an identifier of the first location, wherein the at least one first sound level reading was automatically measured by the first mobile device in response to the first mobile device determining that the first mobile device is at a location that matches the first location;
receive, from a second mobile device of a second user, at least one second sound level reading for a second location of the plurality of locations associated with the geographic region and an identifier of the second location, wherein the at least one second sound level reading was automatically measured by the second mobile device in response to the second mobile device determining that the second mobile device is at a location that matches the second location;
receive, from a third user device, a request for sound level indications associated with the geographic region;

in response to receiving the request, identify the plurality of locations associated with the geographic region;

identify a plurality of sound level readings, wherein, for each location in the plurality of locations, at least one sound level reading of the plurality of sound level readings corresponds to the location and wherein the plurality of sound level readings includes the at least one first sound level reading and the at least one second sound level reading;

generate, for each location in the plurality of locations, a sound level indication based on the at least one sound level reading corresponding to the location; and transmit at least one of the plurality of sound level indications and an identifier of at least one location in the plurality of locations corresponding to the at least one of the plurality of sound level indications to the third user device.

15. The system of claim 14, wherein the hardware processor is further programmed to calculate, for each location in the plurality of locations, a composite sound level reading based on matching readings in the plurality of sound level readings corresponding to the location, wherein the matching readings corresponding to the location include the at least one sound level reading corresponding to the location, and wherein the sound level indication generated for each location in the plurality of locations is generated based on the composite sound level reading for the location.

16. The system of claim 14, wherein the hardware processor is further programmed to transmit instructions that cause the at least one of the plurality of sound level indications to be presented in a visual manner that indicates a safety range.

17. The system of claim 14, wherein the hardware processor is further programmed to transmit instructions that cause the at least one of the plurality of sound level indications to be presented in a map.

18. The system of claim 14, wherein the hardware processor is further programmed to transmit instructions that cause the at least one of the plurality of sound level indications to be presented in a list.

19. The system of claim 18, wherein the instructions cause the at least one of the plurality of sound level indications and the identifier of the at least one location in the plurality of locations to be presented in connection with an indicator of a distance between the at least one location and the third user device.

20. The system of claim 14, wherein the at least one sound level reading for each location in the plurality of locations was recorded at a similar time of day as a time of day at which the request from the third user device was received.

21. The system of claim 20, wherein the at least one sound level reading for each location in the plurality of locations was recorded on a different day as a day on which the request from the third user device was received.

22. The system of claim 14, wherein the hardware processor is further programmed to:

receive, from the second mobile device, an additional sound level reading corresponding to an additional location;

store the additional sound level reading in connection with an identifier of the additional location;

generate a noise complaint based on the additional sound level reading, wherein the noise complaint identifies the additional location; and transmit the noise complaint to the external database.

23. The system of claim 14, wherein at least one of the plurality of sound level readings is made using a microphone.

24. The system of claim 14, wherein the plurality of locations is associated with a category, and wherein the request received from the third user device indicates the category.

25. The system of claim 14, wherein the hardware processor is further programmed to select a subset of the plurality of locations based on the at least one sound level reading identified for each location in the plurality of locations, wherein the identifier of the at least one location in the plurality of locations transmitted to the third user device corresponds to a location in the subset of the plurality of locations.

26. The system of claim 25, wherein the at least one sound level reading for each location in the subset of the plurality of locations is selected based on a comparison of the at least one sound level reading to a predetermined threshold.

27. A non-transitory computer-readable medium containing computer executable instructions that, when executed by a processor, cause the processor to perform a method for providing sound level information for a particular location, the method comprising:

receiving, from a first mobile device of a first user, at least one first sound level reading for a first location of a plurality of locations associated with a geographic region and an identifier of the first location, wherein the at least one first sound level reading was automatically measured by the first mobile device in response to the first mobile device determining that the first mobile device is at a location that matches the first location;

receiving, from a second mobile device of a second user, at least one second sound level reading for a second location of the plurality of locations associated with the geographic region and an identifier of the second location, wherein the at least one second sound level reading was automatically measured by the second mobile device in response to the second mobile device determining that the second mobile device is at a location that matches the second location;

receiving, from a third user device, a request for sound level indications associated with the geographic region;

in response to receiving the request, identifying the plurality of locations associated with the geographic region;

identifying a plurality of sound level readings, wherein, for each location in the plurality of locations, at least one sound level reading of the plurality of sound level readings corresponds to the location and wherein the plurality of sound level readings includes the at least one first sound level reading and the at least one second sound level reading;

generating, for each location in the plurality of locations, a sound level indication based on the at least one sound level reading corresponding to the location; and transmitting at least one of the plurality of sound level indications and an identifier of at least one location in the plurality of locations corresponding to the at least one of the plurality of sound level indications to the third user device.

28. The non-transitory computer-readable medium of claim 27, wherein the method further comprises calculating, for each location in the plurality of locations, a composite sound level reading based on matching readings in the plurality of sound level readings corresponding to the location, wherein the matching readings corresponding to the location include the at least one sound level reading corresponding to the location, and wherein the sound level indication generated for each location in the plurality of locations is generated based on the composite sound level reading for the location.

29. The non-transitory computer-readable medium of claim 27, wherein transmitting the at least one of the plurality of sound level indications and the identifier of the at least one location in the plurality of locations comprises transmitting instructions that cause the at least one of the plurality of sound level indications to be presented in a visual manner that indicates a safety range.

30. The non-transitory computer-readable medium of claim 27, wherein transmitting the at least one of the plurality of sound level indications and the identifier of the at least one location in the plurality of locations comprises transmitting instructions that cause the at least one of the plurality of sound level indications to be presented in a map.

31. The non-transitory computer-readable medium of claim 27, wherein transmitting the at least one of the plurality of sound level indications and the identifier of the at least one location in the plurality of locations comprises transmitting instructions that cause the at least one of the plurality of sound level indications to be presented in a list.

32. The non-transitory computer-readable medium of claim 31, wherein the instructions cause the at least one of the plurality of sound level indications and the identifier of the at least one location in the plurality of locations to be presented in connection with an indicator of a distance between the at least one location and the third user device.

33. The non-transitory computer-readable medium of claim 27, wherein the at least one sound level reading for each location in the plurality of locations was recorded at a similar time of day as a time of day at which the request from the third user device was received.

34. The non-transitory computer-readable medium of claim 33, wherein the at least one sound level reading for each location in the plurality of locations was recorded on a different day as a day on which the request from the third user device was received.

35. The non-transitory computer-readable medium of claim 27, wherein the method further comprises:
  receiving, from the second mobile device, an additional sound level reading corresponding to an additional location;
  storing the additional sound level reading in connection with an identifier of the additional location;
  generating a noise complaint based on the additional sound level reading, wherein the noise complaint identifies the additional location; and
  transmitting the noise complaint to the external database.

36. The non-transitory computer-readable medium of claim 27, wherein at least one of the plurality of sound level readings is made using a microphone.

37. The non-transitory computer-readable medium of claim 27, wherein the plurality of locations is associated with a category, and wherein the request received from the third user device indicates the category.

38. The non-transitory computer-readable medium of claim 27, wherein the method further comprises selecting a subset of the plurality of locations based on the at least one sound level reading identified for each location in the plurality of locations, wherein the identifier of the at least one location in the plurality of locations transmitted to the third user device corresponds to a location in the subset of the plurality of locations.

39. The non-transitory computer-readable medium of claim 38, wherein the at least one sound level reading for each location in the subset of the plurality of locations is selected based on a comparison of the at least one sound level reading to a predetermined threshold.

* * * * *